2,845,413
Patented July 29, 1958

2,845,413

MANUFACTURE OF MODIFIED POLYETHYLENE ALCOHOL TELOMER AND OXIDIZED POLYETHYLENE ALCOHOL TELOMER WAXES

Allen C. Goodrich, East Aurora, and Thomas R. Liston, Hamburg, N. Y., assignors to Allied Chemical & Dye Corporation, New York, N. Y., a corporation of New York No Drawing. Application October 2, 1956
Serial No. 613,369

7 Claims. (Cl. 260—94.9)

This invention relates to polyethylene waxes and more particularly refers to new and improved modified polyethylene waxes and method of preparing them.

Polymethylenic waxes resulting from polymerization of ethylene in the presence of a co-reactant, as disclosed in U. S. Patents 2,504,400, issued April 18, 1950, and 2,683,141, issued July 6, 1954, and modified polyethylene waxes produced by controlled oxidation of the polyethylene waxes, as disclosed in Erchak application Serial No. 515,770, filed June 15, 1955, have found wide application in industry, particularly in the coating and impregnation fields.

An object of the present invention is to provide new modified polyethylene waxes which have superior physical and chemical properties, particularly greater tensile strength and flexibility. Another object of the present invention is to provide a new and improved method for modifying polyethylene waxes to produce waxes of improved physical and chemical properties. Other objects and advantages of the present invention will be apparent from the following description.

One of the starting materials adapted for modification in accordance with the process of the present invention is polyethylene wax in the form of a "telomer," i. e., a polyethylene wax having a terminal residue on the polyethylene chain resulting from polymerization of ethylene in the presence of a co-reactant as disclosed in U. S. Patents 2,683,141 and 2,504,400. Such ethylene waxes, containing an alcohol group in their structure, will be referred to herein as polyethylene alcohol telomer and by this term is meant waxes prepared by polymerizing ethylene under wax-forming conditions in the presence of a liquid aliphatic alcohol having from 1–10 carbon atoms inclusive. For example, when ethylene is polymerized in the vapor phase in the presence of isopropyl alcohol vapor, the structure of the resulting material may be essentially as written below:

$$CH_3(CH_2-CH_2)_nC(OH)(CH_3)_2$$

where "$n$" is an integer in the range of about 35 to about 150. Such polyethylene telomer waxes are characterized by a recurring —$CH_2$— group, i. e., they are essentially polymethylenic in structure. These waxes are normally solid, hard waxy compounds having molecular weights in the range between about 1000 and about 4000, a tensile strength of about 150 to 300 pounds per square inch, a melting point in the range of about 95° C. to about 102° C., a viscosity from about 125 to about 250 centipoises at 140° C., and a hardness measured by penetration for five seconds of a standard ASTM needle (weighted with a 200 gram weight) in the range between about 0.3 mm. and about 0.5 mm.

Another starting material suitable for conversion in accordance with the process of the present invention is an oxidized polyethylene alcohol telomer prepared as described above and produced in a manner disclosed in U. S. application Serial No. 515,770, filed June 15, 1955, involving subjecting polyethylene alcohol telomers to the action of an oxygen-containing gas under conditions to cause absorption of oxygen by the polyethylene alcohol telomer at the rate of between about ½ lb. and about 7 lbs. of oxygen per 100 lbs. of polyethylene alcohol telomer per hour for a period sufficient to cause the absorption of at least about 1 lb. of oxygen per 100 lbs. of polyethylene alcohol telomer. These oxidized polyethylene alcohol telomers are normally solid, hard waxy compounds having molecular weights in the range between about 750 and about 3000, a tensile strength of about 300 to 370 pounds per square inch, a melting point in the range of about 98° C. to about 100° C., a viscosity from about 85 to about 260 centipoises at 140° C. and a hardness measured by penetration for five seconds of a standard ASTM needle, (weighted with 200 gms.) in the range between about 0.5 mm. and about 0.7 mm.

In accordance with the present invention polyethylene alcohol telomers and oxidized polyethylene alcohol telomers may be modified to produce new waxes having markedly improved physical and chemical properties by heating the wax and a small amount of an organic polyisocyanate, less than about 15% by weight of the wax, preferably in an amount of between about 1–10% polyisocyanate, to a temperature between about 100° C. and the decomposition temperature of the wax, preferably of within the range of 125° C. to 250° C. to effect reaction between the polyisocyanate and the wax.

The isocyanates which may be employed in the practice of the present invention are represented by the general formula $$R(N=C=O)_n$$

where R is a hydrocarbon group containing at least four carbon atoms and not more than sixteen carbon atoms, and $n$ is an integer of at least two and not more than four. The hydrocarbon group may be an alkyl radical, an aryl alkyl radical or a diaryl radical. The preferred organic polyisocyanate compounds are diisocyanates having an aromatic radical in the hydrocarbon group. Illustrative examples of isocyanates which may be reacted with the waxes in accordance with the present invention are ethylene diisocyanate, trimethylene diisocyanate, tetra methylene diisocyanate, hexa methylene diisocyanate, 3,3' bitolylene, 4,4' diisocyanate, propylene 1,2-diisocyanate, butylene 1,2-diisocyanate, butylene 2,3-diisocyanate, toluene diisocyanate, or any other diisocyanate of the general formula

OCNRNCO

Sulfur may be substituted for oxygen as in the formula

SCNRNCS

The preferred isocyanate is 3,3' bitolylene 4,4' diisocyanate.

In carrying out the process according to the present invention, polyethylene alcohol telomer or oxidized polyethylene alcohol telomer is charged to a suitable reaction vessel desirably equipped with a stirrer and adapted for application of heat to the contents of the reaction vessel and the wax therein heated to a temperature above 100° C. and above the melting point of the wax but below the decomposition temperature of the wax, generally within the range of about 100–300° C. Organic isocyanate is gradually added to the molten wax preferably with stirring and heating of the reaction mixture continued until the desired product is produced. An amount of isocyanate below ½% by weight of the wax does not sufficiently enhance the properties of the wax and accordingly we prefer to employ at least 1% of isocyanate for reaction with the wax. Quantities materially above 10–15% isocyanate result in thick gels usually of poor color and high melting point which are difficult to use in coating and impregnation applications. The preferred range of quantity of organic isocyanate for reaction with the wax is between about 1 and 10%. The amount of isocyanate employed even within the range of 1–10% has an effect on the product particularly with respect to the viscosity. More specifically, the addition of small amounts of the order of ½% of isocyanate to the wax increases the viscosity of the wax only slightly. Larger quantities of isocyanate of the order of 5–10% increase the viscosity of the final product materially as compared to the initial viscosity of the wax. Other factors which have a material effect on the viscosity of the final product are temperature and time. Generally at lower reaction temperatures, for example, about 125–175° C., the viscosity of the final product as compared to the initial viscosity of the wax is not as high as the viscosity would be when carrying out the reaction at higher temperatures of the order of 175–250° C. Also, as indicated, the longer the time of reaction, usually the greater the viscosity of the final product. From the foregoing it will be evident that the characteristics, particularly the viscosity of the reaction product, can be regulated by controlling the quantity of isocyanate, the temperature and time. Merely as illustrative, a polyethylene alcohol telomer which had a viscosity of 150 centipoises when heated with 1% 3,3' bitolylene 4,4' diisocyanate at a temperature of 155° C. for two hours showed only an increase in viscosity to about 400 centipoises and when the time of heating was extended to about 16 hours the viscosity increased to about 1000 centipoises. Another portion of the polyethylene alcohol telomer when heated with 10% 3,3' bitolylene 4,4' diisocyanate for a period of three hours at a temperature of 155° C. resulted in the product having a viscosity of 3100 centipoises. Another portion of the polyethylene alcohol telomer admixed with 2% 3,3' bitolylene 4,4' diisocyanate and heated to a temperature of 210° C. showed a rapid increase in viscosity after 20 minutes and at the end of a one hour heating increased in viscosity to over 2000 centipoises. In a similar test at 210° C., except that the amount of 3,3' bitolylene 4,4' diisocyanate was increased to 4%, the viscosity after the first 10 minutes rapidly increased so that at the end of 20 minutes heating the resultant product had a viscosity of over 9000 centipoises. Thus, in general an increase in amount of isocyanate will result in a higher viscosity product and higher reaction temperatures will usually provide higher viscosity products for the same amount of isocyanate added. Paper coating frequently requires wax products of lower viscosity below the gel point and for this purpose the percentages of isocyanate below 2–3% are preferred. Modified polyethylene alcohol telomer produced by reaction with higher percentages of isocyanate have their use where high viscosity is desirable and gel texture is not objectionable. In the paper field, viscosity is used to control penetration and for this reason the higher viscosity materials would be desirable. Materials of low penetration and high flow temperatures are also needed in the carbon paper field. Products produced by reaction of the polyethylene alcohol telomer with higher percentages of isocyanate, preferably 5–15% or higher, have increased resistance to heat and decreased solubility in solvents. Films of the modified polyethylene alcohol telomer will resist flow at temperatures well above 210° C. which would be prohibitive for unmodified polyethylene. Coatings made from the modified polyethylene alcohol telomer show good resistance to the action of boiling xylene whereas the unmodified polyethylene will dissolve in xylene at an elevated temperature. Of great importance is the material increase in the tensile strength of the modified polyethylene alcohol telomer as compared to the unmodified polyethylene. More specifically, reaction with 1% isocyanate increases the tensile strength more than 50%, and reaction with 5% isocyanate results in a product which has more than twice the tensile strength. In addition, the modified polyethylene waxes showed improvement in hardness and flexibility making their use desirable in the polish and floor coating field. When employed as a paper coating the modified polyethylene products showed superior gloss and good moisture vapor transmission qualities. Flexible, tough, chemical resistant films of modified polyethylene which adhere tenaciously to metal were formed when baked in an oven above 150° C. in contact with air.

The hardness of the wax was determined by measuring the penetration of a standard ASTM needle under a 200 gram load after five seconds on a surface at 75° F. The harder the wax, the less the degree of penetration of the needle.

Molecular weight determinations were made by the method described in the article by I. Harris, published in the Journal of Polymer Science, 8, 353 (1952), which involves determination of the xylene solution viscosity in an Ostwald viscosimeter at 75° C. and calculation of the molecular weight from the data thus obtained.

The melting points or solidification points given here were determined by the "ball and shouldered ring method."

The viscosity measurements were obtained with a Brookfield viscometer.

The tensile strengths were measured on a Dillon dynamometer employing dumb-bell test moldes necked to 1 x 1 cm.

Seal tests were performed according to the following procedure: One side coated paper samples cut 18" x 2" are clamped coated sides together at the bottom and weighted with 100 grams. The upper ends are taped together and pulled over a 1¼" diameter cartridge heater at the rate of five inches per minute by a constant speed motor. The paper is pulled at 90° to the force of the hanging weight (or vertical) with the uncoated side of one paper against the cartridge heater.

Samples sealed by the above procedure are cut into one inch widths and tested in a Socony-vacuum seal tester. The samples were pulled apart at a rate of three inches per minute with a 100 gram weight on the lower end. The seal strength was read from the scale.

The moisture vapor transmission rates were the weights of water transmitted per 24 hours, per 100 square inches of single side coated sulfite paper. The coated side was placed toward the higher humidity at 100° F. The air on one side of the paper was at 95% relative humidity and the other side at 5% relative humidity.

Grease resistance was determined by assembling the single side coated paper specimens on a glass plate. A metal washer was placed on top of the coated side of the paper to keep it flat and to confine the test liquid. The penetration is observed through a flat mirror placed underneath the specimen. The grease resistance was the time required for the reagent to penetrate the sheet and show a stain on the bottom side of the paper.

The following examples illustrate the present invention and demonstrate the improved properties of the modified polyethylene waxes.

*Example 1*

The charging material was a polyethylene alcohol telomer prepared by polymerizing ethylene in the presence of isopropyl alcohol at a temperature of 185° C. and a pressure of 435 atmospheres and having the following properties: molecular weight about 2000; melting point 97° C.; hardness by penetration 0.5 mm.; viscosity 240 cps. at 140° C.; tensile strength 250 pounds per square inch. The seal strength of a 9–12 pound per 3000 sq. ft. ream coating on sulfite paper was 36 gms./in. when sealed at 230° F.

The charging material was placed in a reaction vessel and heated to a temperature of 155° C. To the melted wax was added one percent by weight of 3,3' bitolylene 4,4′ diisocyanate and the mixture heated at 155° C. for 16 hours. The resultant product had the following properties: hardness by penetration 0.5 mm.; viscosity 1500 cps. at 140° C.; tensile strength 450 pounds per square inch.

Example 2

The reaction was carried out with the same charging material under substantially the same conditions except that the amount of diisocyanate was increased to 2%. The product had the following properties: melting point above 150° C.; and hardness by penetration 0.6 mm.

Example 3

The reaction was carried out with the same charging material under substantially the same conditions except that the amount of diisocyanate was increased to 10%. The resultant product was solid at 150° C.

Example 4

The reaction was carried out with the same charging material under substantially the same conditions except that the charge contained 2% of diisocyanate and the reaction was conducted at 170° C. for four hours. The resultant product had a viscosity of 1200 centipoises.

Example 5

The reaction was carried out with the same charging material under substantially the same conditions except that the charge containing 2% of diisocyanate was heated at 210° C. for 45 minutes. The product had a viscosity of 2000 centipoises.

Example 6

The charging material was an oxidized polyethylene alcohol telomer prepared by oxidizing the polyethylene described in Example 1 as disclosed in U. S. application Serial No. 515,770 filed June 15, 1955. This material has the following properties:

Hardness by penetration___ 0.5 mm.
Viscosity_____ 260 cps. at 140° C.
Tensile strength_____ 367 p. s. i.
Seal strength:
    Sealed at 240° F_____ 52 gms./in.
    Sealed at 220° F_____ 53 gms./in.
M. V. T. R_____ 4 gms./100 sq. in./24 hours.
Greased resistance_____ Failed in 7 to 11 days.

The charging material was placed in a reaction vessel and heated to 135° C. Two percent of 3,3′ bitolylene 4,4′ diisocyanate was added and the mixture heated with agitation to a temperature of 185° C. This took 2¾ hours. The product had the following physical properties:

Hardness (penetration)_____ 0.35 mm.
Viscosity_____ 990 cps.
Tensile strength_____ 640 p. s. i.
Seal strength:
    Sealed at 240° F_____ 76 gms./in.
    Sealed at 220° F_____ 76 gms./in.
M. V. T. R_____ 3.0 gms./100 sq. in./24 hrs.
Grease resistance_____ Good after 33 days.
Flexibility_____ Improved.

Example 7

Reaction carried out with the same oxidized polyethylene alcohol telomer as was employed in Example 6. The charging material was placed in a reaction vessel and heated to 155° C. Three percent of 3,3′ bitolylene, 4,4′ diisocyanate was added and the temperature raised to 210° C. and held for 15 minutes. The product had a viscosity of 10,000 cps.

Example 8

The charging material was a mixture of polyethylene alcohol telomer described in Example 1 and a higher molecular weight polyethylene (molecular weight 12,000). In this experiment the mixture containing 15% of polyethylene alcohol telomer and 85% of the higher molecular weight polyethylene was placed in a reaction vessel and heated to 155° C. To the melted mixture was added 2% by weight of 3,3′ bitolylene 4,4′ diisocyanate and the mixture heated at 210° C. for one hour. An increase in viscosity was observed.

Example 9

The charging material was a mixture of 85% oxidized polyethylene alcohol telomer prepared as described in U. S. application Serial No. 515,770, filed June 15, 1955, and also a higher molecular weight polyethylene (molecular weight 12,000). In this experiment the mixture was placed in a reaction vessel and heated to 170° C. To the melted mixture was added 2% by weight of 3,3′ bitolylene 4,4′ diisocyanate and the mixture heated at 170° C. for three hours. The viscosity of the product increased at 170° C.

Although certain preferred embodiments of the invention have been disclosed for purpose of illustration it will be evident that various changes and modifications may be made therein without departing from the scope and spirit of the invention.

We claim:

1. A process for modifying polyethylene waxes to produce waxes having improved properties which comprises heating a polyethylene wax selected from the group consisting of a polyethylene alcohol telomer and an oxidized polyethylene alcohol telomer with about 1–15% by weight of an organic polyisocyanate having a hydrocarbon group containing not more than 16 carbon atoms to a temperature between about 100° C. and 300° C. to effect reaction between the polyisocyanate and the wax.

2. A process for modifying polyethylene alcohol telomer to produce a wax having improved properties which comprises heating the polyethylene alcohol telomer with about 1–15% by weight of an organic polyisocyanate having a hydrocarbon group containing not more than 16 carbon atoms to a temperature between about 100° C. and 300° C. to effect reaction between the polyisocyanate and the polyethylene alcohol telomer.

3. A process for modifying oxidized polyethylene alcohol telomer to produce a wax having improved properties which comprises heating the oxidized polyethylene alcohol telomer with about 1–15% by weight of an organic polyisocyanate having a hydrocarbon group containing not more than 16 carbon atoms to a temperature between about 100° C. and 300° C. to effect reaction between the polyisocyanate and the oxidized polyethylene alcohol telomer.

4. A process for modifying polyethylene waxes to produce waxes having improved properties which comprises heating a polyethylene wax selected from the group consisting of a polyethylene alcohol telomer and an oxidized polyethylene alcohol telomer in an amount of between about 1–10% by weight of an organic polyisocyanate having a hydrocarbon group containing not more than 16 carbon atoms to a temperature between about 125° C. and about 250° C. to effect reaction between the polyisocyanate and the wax.

5. A process for modifying polyethylene waxes to produce waxes having improved properties without material alteration in viscosity characteristics which comprises heating a polyethylene wax selected from the group consisting of a polyethylene alcohol telomer and an oxidized polyethylene alcohol telomer in an amount of between about 1–3% by weight of an organic polyisocyanate having a hydrocarbon group containing not more than 16 carbon atoms to a temperature between about 125° C. and 175° C. to effect reaction between the polyisocyanate and the wax.

6. A process for modifying polyethylene waxes to produce waxes having improved properties with material increase in the viscosity characteristics which comprises heating a polyethylene wax selected from the group consisting of a polyethylene alcohol telomer and an oxidized polyethylene alcohol telomer in an amount of between about 5–10% by weight of an organic polyisocyanate having a hydrocarbon group containing not more than 16 carbon atoms to a temperature between about 175° C. and 250° C. to effect reaction between the polyisocyanate and the wax.

7. A process for modifying polyethylene waxes to produce waxes having improved properties which comprises heating a polyethylene wax selected from the group consisting of a polyethylene alcohol telomer and an oxidized polyethylene alcohol telomer with about 1–15% by weight of 3,3' bitolylene 4,4' diisocyanate to a temperature between about 100° C. and 300° C. to effect reaction between the 3,3' bitolylene 4,4' diisocyanate and the wax.

References Cited in the file of this patent
UNITED STATES PATENTS

| | | |
|---|---|---|
| 2,754,278 | Wilson et al. | July 10, 1956 |
| 2,766,214 | Erchak et al. | Oct. 9, 1956 |

UNITED STATES PATENT OFFICE
CERTIFICATE OF CORRECTION

Patent No. 2,845,413                    July 29, 1958

Allen C. Goodrich et al.

It is hereby certified that error appears in the above numbered patent requiring correction and that the said Letters Patent should read as corrected below.

In the grant, lines 2 and 3, and line 13, and in the heading to the printed specification, lines 6 and 7, name of assignee, for "Allied Chemical & Dye Corporation" read -- Allied Chemical Corporation --.

Signed and sealed this 25th day of November 1958.

(SEAL)
Attest:

KARL H. AXLINE
  Attesting Officer

ROBERT C. WATSON
Commissioner of Patents